United States Patent [19]

Rogers

[11] 4,191,318
[45] Mar. 4, 1980

[54] BREAKAWAY UNCOILER

[76] Inventor: John W. Rogers, 22175 Douglas Rd., Shaker Heights, Ohio 44122

[21] Appl. No.: 972,552

[22] Filed: Dec. 22, 1978

[51] Int. Cl.$^2$ ............................................. B26F 3/00
[52] U.S. Cl. ................................... 225/103; 225/93; 242/56.4
[58] Field of Search .................... 225/153, 102, 93, 2, 225/96.5, 4; 242/56.1, 56.4

[56] References Cited
U.S. PATENT DOCUMENTS

| | | | |
|---|---|---|---|
| 2,742,965 | 4/1956 | Drummond, Jr. | 225/93 X |
| 2,998,134 | 8/1961 | Gray | 225/4 X |
| 3,904,097 | 9/1975 | Grambo, Jr. et al. | 225/103 |

Primary Examiner—Frank T. Yost
Attorney, Agent, or Firm—John F. Carney

[57] ABSTRACT

Apparatus is described for detaching individual strip coils from a construct of wound sheet metal web material that has been partially slit along parallel lines to produce parting lines containing frangible connections between adjacent coils. The coil detaching means includes a self-contained rotatable mount for the detached coil which becomes effective upon detachment of the coil from the construct to permit dispensing of the strip material without need to transfer the coil from the apparatus to an uncoiler.

12 Claims, 5 Drawing Figures

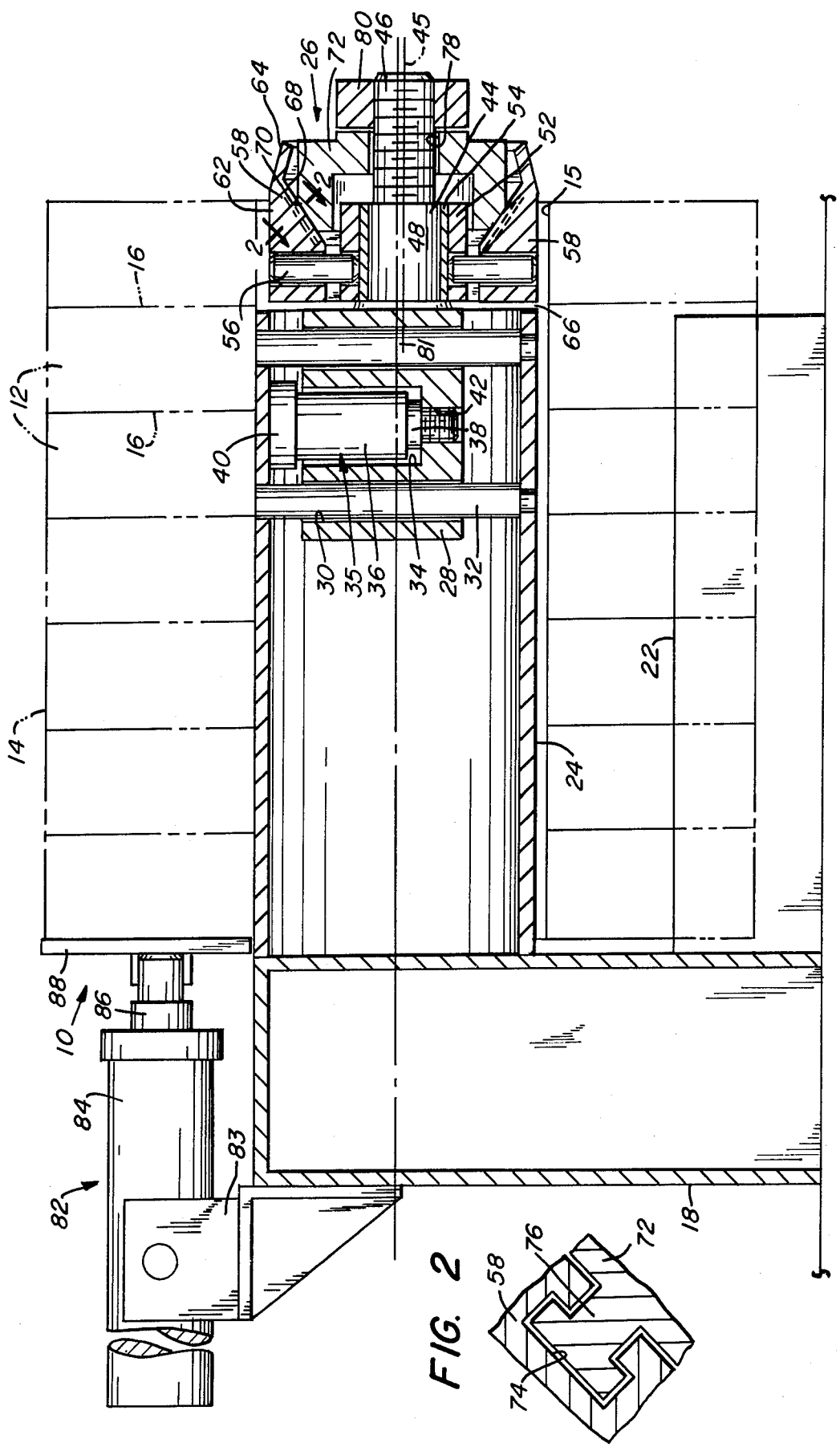

BREAKAWAY UNCOILER

BACKGROUND OF THE INVENTION

In the manufacture of flat rolled metal, it is the practice to produce the web product with a greater width than is required by the end user and to subsequently slit the web into narrower strips of the desired lateral dimension. According to the practice, the metal web is coiled following rolling, after which, in a separate operation, the coiled web is placed on an uncoiler, unwound, trained through a slitting station and the so-produced strips rewound on the coiler as a number of separate coils.

An improved practice for the production of coiled strip is disclosed in U.S. patent application Ser. Nos. 713,599, 818,795 and 819,313, filed Aug. 12, 1976, July 25, 1977 and July 27, 1977 respectively. According to this improved practice, following rolling of the metal, the web is slit along lines parallel to its edge in a manner that produces parting lines containing intermittently spaced tabs that interconnect the adjacent edges of the strips whereby, upon coiling, there results a construct containing a plurality of coils joined by frangible connections. It is contemplated that shipment of the coil and the majority of the handling operations thereof will be undertaken with the construct intact. The constructs are arranged such that in some applications, individual coils can, as desired, be detached intact from the construct and subsequently unwound, as, for example, at a press or punch, to feed the contained strip material to the tool.

Coil constructs contemplated for use in these applications are sheet metal rolls that may be upwards of four feet in diameter and over ten tons in weight with individual coils in the construct each weighing upwards of four hundred pounds per inch of width. Besides requiring forces as great as 10,000 p.s.i. to detach an individual coil from a construct, it will be appreciated that heavy equipment and considerable effort is required to thereafter transfer the detached coil to an uncoiler, or the like, to permit the coiled strip to be dispensed to the tool by unwinding.

It is, accordingly, toward equipment that facilitates the detachment of individual coils from a construct and the elimination of the intermediate handling of the detached coil heretofore required to operatively position it on an uncoiler that the present invention is directed.

SUMMARY OF THE INVENTION

According to the present invention there is provided apparatus for detaching and dispensing sheet metal strip material from a construct having an axial opening therethrough and including a plurality of axially spaced coils of strip material interconnected by frangible connections. The apparatus comprises a frame having a construct support attached at one end thereto adapted to telescopically receive the construct through the axial opening therein. Means are provided at the free end of the support for engaging a selected coil for detachment from the construct. This means is vertically movable with respect to the support to fracture the interconnections between a selected coil and the construct. The means further includes apparatus by which the detached coil is rotatably mounted with respect to said support to permit rotation thereof following fracture of said interconnections.

For a better understanding of the invention, its operation advantages and the specific objectives obtained by its use, reference should be made to the accompanying drawings and description which relate to a preferred embodiment thereof.

BRIEF DESCRIPTION OF THE DRAWINGS

FIG. 1 is an elevational section of apparatus according to the present invention;

FIG. 2 is a sectional view taken along line 2—2 of FIG. 1;

DESCRIPTION OF THE PREFERRED EMBODIMENT OF THE INVENTION

Figure 4:
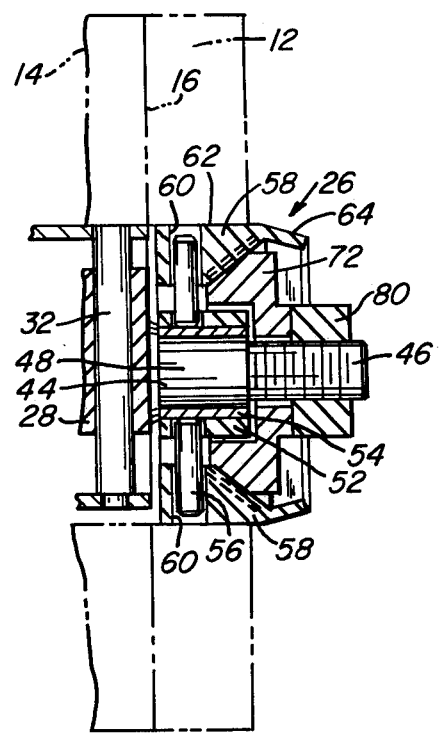
FIG. 4 is a partial elevational section of the apparatus illustrating the operative parts thereof at an intermediate step of the operational process.

In the drawings there is shown apparatus 10 operative to separate coils 12 from a construct 14 of wound sheet metal web material and, thereafter, to rotatably support the separated coil for dispensing the strip material contained therein. The construct 14 is of a type described in U.S. patent application Ser. No. 713,599 to J. W. Rogers, the inventor herein, in which the construct is formed of wound sheet metal web material having a plurality of laterally spaced parting lines 16 in the surface thereof defining frangibly interconnected coiled strips therebetween. The parting lines 16 contain intermittently spaced tabs (not shown) formed of residual web material bridging the interstice between adjacent strips and forming the connections between the coils 12. The construct 14 is wound with the parting lines 16 disposed in substantial coplanar or radially aligned relation such that individual strips can be detached as wound coils 12 by the concurrent fracture of the connecting tabs disposed along the respective parting lines.

The coil separating and dispensing apparatus 10 of the present invention is operative to effect fracture of the tabs connecting the endmost coil 12 to the construct 14 and, following fracture of the tabs, to serve as an uncoiling reel from which the coiled strip can be payed out to a work station (not shown) or the like. The apparatus 10 comprises base support structure including an upstanding pedestal 18, floor-supported by a pair of oppositely spaced legs 20 and 22 that extend forwardly from the face of the pedestal at the bottom thereof.

A construct support comprising a cylindrical tubular member 24 is attached at one end, as by welding, to the face of the pedestal 18. This member extends forwardly from the pedestal 18 parallel to, and substantially equidistantly spaced between the legs 20 and 22. Its diameter is such as to be freely received within the axial opening 15 through the construct 14 thereby to support the construct in an elevated position above the floor.

The free end of the construct support 14 mounts an assembly, designated generally as 26 in the drawings, adapted for vertical movement with respect to the support axis. This assembly 26 comprises a body 28 generally rectangular in section and having a pair of longitudinally spaced, vertically extending clearance openings 30 adapted to slidingly engage pins 32 that extend diametrically across the support 24 and attaching at opposite ends thereto. The body 28 contains a central recess 34 to accommodate a fluid motor 35 consisting of cylinder 36 and piston 38, the former being fixed to the interior surface of the support 24 through mounting pad 40 and the latter being threadedly attached to the body in opening 42.

The forwardly facing side of the body 28 contains an integrally formed shaft 44, the outer end portion 46 of which is threaded. Intermediate the threaded portion 46 and the facing side of the body 28 the shaft is formed as a cylindrical bearing surface 48.

Rotatably supported on the bearing surface 48 on shaft 44 is an expander assembly comprising a cylindrical hub 52 having a bushing 54 retained therein to journal the assembly for rotation on the shaft. A plurality of radially extending pins 56 here shown as four in number are attached to the hub 52 at circumferentially spaced points thereabout. Each of the pins 56 guidingly receives an expander segment 58 through an opening 60 therein for radial in and out movement as hereinafter described.

Each expander segment 58 comprises a body having an arcuate outer surface 62 adapted to engage the facing surface of the axial opening 15 of the construct 14 when expanded. Its leading end is inturned, as shown at 64 to cooperatively form with the leading ends of the other segments a generally conical surface to facilitate reception of the construct onto the support 24. The rear ends of the segments 58 are spaced, as at 66, slightly forwardly of the free end of the support 24 to provide a clearance space between the rotatable expander 50 and stationary support 24.

The underside of each segment 58 is formed with an arcuate tapered surface 68 for engagement with the cooperating conical surface 70 of expander sleeve 72. A T-slot 74 is provided in the segment surface 68 for reception of an associated T-bar 76, four of which are integrally formed at circumferentially spaced points about the surface of the sleeve 72. The sleeve 72 contains a clearance opening 78 for reception over the threaded portion 46 of shaft 44 and is moved inwardly and outwardly along the shaft by means of an operating nut 80 that is threadedly received thereon.

It will be appreciated from examination of FIG. 1 of the drawing that the position of the shaft 44 on the body 28 is such that, with the piston 38 in its fully retracted position and the upper surface of the body in abutment with the motor mounting pad 40, the shaft axis 45 is vertically displaced downwardly from the axis 25 of support 24 by an amount substantially equal to the clearance space, here indicated as 81, between the interior of the construct opening 15 and the external surface of the support 24. This dimensional relationship is necessary in order to permit the expander segments 58 to uniformly engage the construct about the circumference of the opening 15.

The hereindescribed apparatus includes a construct positioning motor 82 mounted by bracket 83 at the rear of the pedestal 18 including a fluid operated cylinder 84 and ram 86, the leading end of which mounts a pusher plate 88. The motor 82 operates to move the construct 14 along the support 24 so as to dispose successive coils 12 in position for detachment as hereinafter described.

Figure 5:
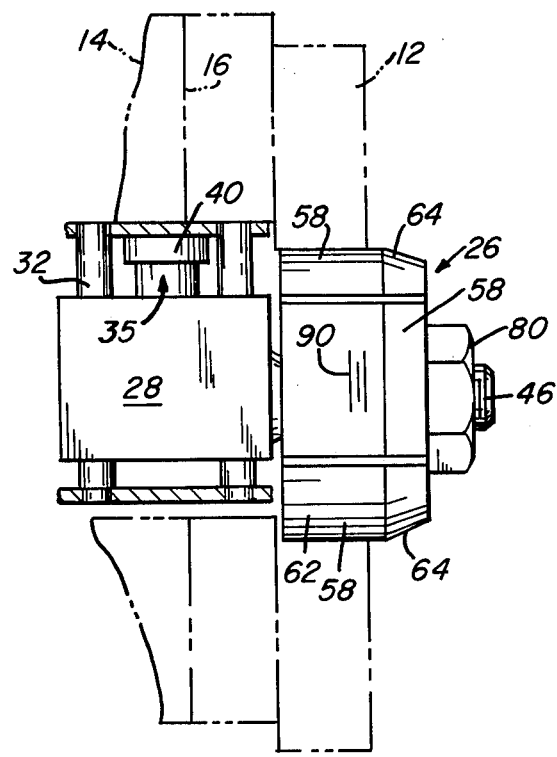
FIG. 5 is a view similar to FIG. 4 illustrating the operative parts of the apparatus following detachment of a coil from the cluster.
Figure 3:
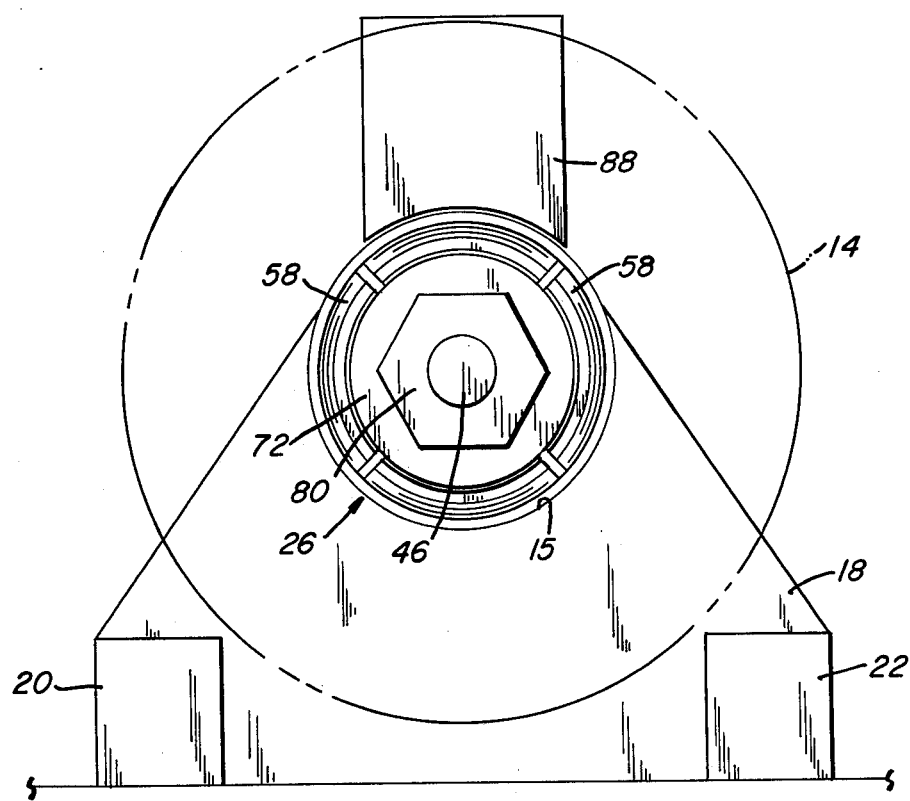
FIG. 3 is an end view of the apparatus of FIG. 1.

The operation of the hereindescribed apparatus 10 is as follows. With the piston 38 in its retracted position to position the body 28 in abutment with the cylinder mounting pad 40 and the operating nut 80 of expander assembly 50 in its withdrawn position, as shown in FIG. 1, the expander segments 58 are disposed in their retracted position and the apparatus is in readiness for reception of a construct 14. The construct 14 is inserted onto the support 24 into abutment with the pusher plate 88. Thereafter, the positioning motor 82 is actuated by means (not shown) to push the construct 14 forwardly until its forward end is placed in position on a positional mark 90, etched or otherwise provided on the exterior surface of the segments 58. This locates the parting line 16 between the endmost coil 12 in alignment with the space 66 between the expander assembly 50 and the free end of the support 24. Next, the expander operator nut 80 is threaded inwardly to expand the segments 58 into tight engagement with the surface of the construct opening 15 as shown in FIG. 4. Following this the motor 35 is actuated to extend the piston 36 and move the body 28 downwardly thereby displacing the assembly 26 with respect to the support as shown in FIG. 5. This movement of the assembly 26 generates sufficient force to effect fracture of the tabs in the affected parting line 16 substantially concurrently thereby detaching the engaged coil 12 from the construct 14. With the coil 12 detached from the construct 14 the expander assembly 50 is free to rotate on the shaft 44 whereby the sheet metal strip contained therein can be dispensed by unwinding of a tool or other process apparatus adjacent which the described apparatus is advantageously positioned.

It will be appreciated that, besides providing means for effectively detaching individual coils from a wound construct in a manner that requires a minimum of manual effort and that avoids the danger of marring the resultant sheet metal strip product, the described apparatus is adapted, following separation of the coil from the construct, to operate as an uncoiler reel whereby the resultant strip product can be unwound and fed directly to the tool without need for an intermediate coil transfer step. Elimination of this intermediate step concomitantly results in a reduction in the time, effort and expense required to effect processing of the work product thus rendering the overall processing procedure more effecient.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus for detaching and dispensing sheet metal strip material from a construct having an axial opening therethrough and including a plurality of axially spaced coils of strip material interconnected by frangible connections, said apparatus comprising:
    (a) a frame;
    (b) a construct support attached at one end to said frame, said support being adapted to telescopically receive said construct through the axial opening therein;
    (c) means at the free end of said support for engaging a selected coil for detachment from said consturct, said means being vertically movable with respect to said support to fracture the interconnections between a selected coil and the construct and being rotatably mounted with respect to said support to permit rotation of the engaged coil following fracture of said interconnections.

2. Apparatus as recited in claim 1 in which said coil engaging means includes:

(a) a body slidably secured to said construct support;
(b) means for moving said body in alternate vertical directions with respect to said support; and
(c) rotatable means journaled to said body adapted to engage the coil selected for detachment from said construct.

3. Apparatus as recited in claim 2 in which said rotatable means includes a plurality of segments and means for expanding said segments radially into engagement with said selected coil.

4. Apparatus as recited in claim 3 in which said rotatable means are axially spaced from the free end of said support.

5. Apparatus as recited in claim 4 in which said segments include arcuate exterior surfaces for engagement with said selected coil about the periphery of the axial opening therein.

6. Apparatus as recited in claim 3 in which said segments and said expanding means have cooperating inclined surfaces to effect radial expansion of said segments.

7. Apparatus as recited in claim 6 in which said expander means comprises:
(a) a shaft attached to and extending forwardly of said movable body parallel to the axis of said construct support;
(b) said segments being journalled for rotation about said shaft;
(c) a movable sleeve coaxially disposed on said shaft, said sleeve including an inclined surface cooperable with that on said segments for expanding or retracting the same in response to movement of said sleeve; and
(d) means for moving said sleeve axially of said shaft.

8. Apparatus as recited in claim 7 including:
(a) a hub rotatably mounted on said shaft;
(b) a plurality of pins extending radially from said hub for slidably retaining said segments for guided radial movement with respect to said hub; and
(c) means for securing said segments to said expander sleeve.

9. Apparatus as recited in claim 8 in which said segment securing means comprises a T-bar and slot connection between each of said segments and said expander sleeve.

10. Apparatus as recited in claim 7 in which said shaft includes a threaded portion and a bearing portion intermediate said threaded portion and the facing side of said body, and an operator nut received on said threaded portion operative to move said sleeve axially of said shaft.

11. Apparatus as recited in claim 2 in which said body moving means comprises a fluid motor attached to said construct support and operatively connected to said body.

12. Apparatus as recited in claim 1 including means operative to move a cluster retained on said support longitudinally thereof.

* * * * *